United States Patent
Mao et al.

(10) Patent No.: US 11,610,423 B2
(45) Date of Patent: Mar. 21, 2023

(54) SPATIO-TEMPORAL-INTERACTIVE NETWORKS

(71) Applicant: Waymo LLC, Mountain View, CA (US)

(72) Inventors: Junhua Mao, Palo Alto, CA (US); Jiyang Gao, San Jose, CA (US); Yukai Liu, Sunnyvale, CA (US); Congcong Li, Cupertino, CA (US); Zhishuai Zhang, Baltimore, MD (US); Dragomir Anguelov, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 179 days.

(21) Appl. No.: 17/099,642

(22) Filed: Nov. 16, 2020

(65) Prior Publication Data

US 2021/0150199 A1  May 20, 2021

Related U.S. Application Data

(60) Provisional application No. 62/936,259, filed on Nov. 15, 2019.

(51) Int. Cl.
| | |
|---|---|
| G06V 40/10 | (2022.01) |
| G06K 9/62 | (2022.01) |
| B60W 30/095 | (2012.01) |
| G06V 10/25 | (2022.01) |

(52) U.S. Cl.
CPC ....... *G06V 40/103* (2022.01); *B60W 30/0956* (2013.01); *G06K 9/6232* (2013.01); *G06V 10/25* (2022.01); *B60W 2554/4029* (2020.02); *G06T 2207/10028* (2013.01); *G06T 2207/20084* (2013.01); *G06T 2207/30252* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 10,613,252 B1 * | 4/2020 | Mecikalski | G06F 17/10 |
| 2015/0371110 A1 | 12/2015 | Hwang et al. | |
| 2019/0061771 A1 | 2/2019 | Bier et al. | |
| 2019/0147372 A1 * | 5/2019 | Luo | G06V 10/82 |
| | | | 706/20 |
| 2019/0310651 A1 | 10/2019 | Vallespi-Gonzalez et al. | |
| 2020/0298891 A1 * | 9/2020 | Liang | G06N 20/00 |
| 2021/0049395 A1 * | 2/2021 | Peng | G06V 40/23 |
| 2021/0073997 A1 * | 3/2021 | Vora | G06T 7/55 |
| 2021/0221405 A1 * | 7/2021 | Zhu | G06V 40/10 |

OTHER PUBLICATIONS

International Preliminary Report on Patentability in International Appln. No. PCT/US2020/060740, dated May 27, 2022, 9 pages.

(Continued)

*Primary Examiner* — Santiago Garcia
(74) *Attorney, Agent, or Firm* — Fish & Richardson P.C.

(57) ABSTRACT

Methods, systems, and apparatus, including computer programs encoded on computer storage media, for processing point cloud data using spatio-temporal-interactive networks.

18 Claims, 4 Drawing Sheets

(56) References Cited

OTHER PUBLICATIONS

Liu et al., "MeteorNet: Deep Learning on Dynamic 3D Point Cloud Sequences," Proceedings of the IEEE/CVF International Conference on Computer Vision, 2019, pp. 9246-9255.
PCT International Search Report and Written Opinion in International Appln. No. PCT/US2020/060740, dated Mar. 5, 2021, 14 pages.
Alahi et al., "Social lstm: Human trajectory prediction in crowded spaces," Proceedings of the IEEE Conference on Computer Vision and Pattern Recognition, 2016, pp. 961-971.
Battaglia et al., "Relational inductive biases, deep learning, and graph networks," CoRR, Jun. 2018, arxiv.org/abs/1806.01261, 40 pages.
Casas et al., "Intentnet: Learning to predict intention from raw sensor data," Proceedings of the 2nd Conference on Robot Learning, 2018, 87:947-956.
Chang et al., "Argoverse: 3d tracking and forecasting with rich maps," Proceedings of tire IEEE/CVF Conference on Computer Vision and Pattern Recognition, 2019, pp. 8748-8757.
Girshick, "Fast r-cnn," Proceedings of the IEEE International Conference on Computer Vision, 2015, pp. 1440-1448.
Gupta et al., "Social gan: Socially acceptable trajectories with generative adversarial networks," Proceedings of the IEEE Conference on Computer Vision and Pattern Recognition, 2018, pp. 2255-2264.
He et al., "Mask r-cnn," Proceedings of the IEEE International Conference on Computer Vision, 2017, pp. 2961-2969.
Hong et al., "Rules of the road: Predicting driving behavior with a convolutional model of semantic interactions," Proceedings of the IEEE/CVF Conference on Computer Vision and Pattern Recognition, 2019, pp. 8454-8462.
Hou et al., "Tube convolutional neural network (t-cnn) for action detection in videos," Proceedings of the IEEE International Conference on Computer Vision, 2017, pp. 5822-5831.
Kalogeiton et al., "Action tubelet detector for spatiotemporal action localization." Proceedings of the IEEE International Conference on Computer Vision, 2017, pp. 4405-4413.
Lang et al., "Pointpillars: Fast encoders for object detection from point clouds," Proceedings of the IEEE Conference on Computer Vision and Pattern Recognition, 2019, pp. 12697-12705.
Lee et al., "Desire: Distant future prediction in dynamic scenes with interacting agents," Proceedings of the IEEE Conference on Computer Vision and Pattern Recognition, 2017, pp. 336-345.
Lin et al., "Focal loss for dense object detection," Proceedings of the IEEE International Conference on Computer Vision, 2017, pp. 2980-2988.
Liu et al., "SSD: Single shot multibox detector," European conference on computer vision, Sep. 2016, pp. 21-37.
Luo et al., "Fast and furious: Real time end-to-end 3D detection, tracking and motion forecasting with a single convolutional net," Proceedings of the IEEE Conference on Computer Vision and Pattern Recognition, 2018, pp. 3569-3577.
Milan et al., "Online multi-target tracking using recurrent neural networks," Proceedings of the AAAI Conference on Artificial Intelligence, Feb. 2017, 31(1):4225-4232.
Ngiam et al., "StarNet: Targeted computation for object detection in point clouds," CoRR, Aug. 2019, arxiv.org/abs/1908.11069, 12 pages.
Redmon et al., "You only look once: Unified, real-time object detection," Proceedings of the IEEE Conference on Computer Vision and Pattern Recognition, 2016, pp. 779-788.
Ren et al., "Faster R-CNN: Towards real-time object detection with region proposal networks," CoRR, Jun. 2015, arxiv.org/abs/1506.01497, 14 pages.
Ronneberger et al., "Unet: Convolutional networks for biomedical image segmentation," International Conference on Medical Image Computing and Computer-Assisted Intervention, Nov. 2015, pp. 234-241.
Santoro et al., "A simple neural network module for relational reasoning," CoRR, Jun. 2017, arxiv.org/abs/1706.01427, 16 pages.
Sun et al., "Relational action forecasting," Proceedings of the IEEE/CVF Conference on Computer Vision and Pattern Recognition, 2019, pp. 273-283.
Tang et al., "Object detection in videos by high quality object linking," IEEE Transactions on Pattern Analysis and Machine Intelligence, May 1, 2020, 42(5):1272-1278.
Wang et al., "Videos as space-time region graphs," Proceedings of the European Conference on Computer Vision (ECCV), 2018, pp. 399-417.
Yan et al., "SECOND: Sparsely embedded convolutional detection," Sensors, Oct. 2018, 18(10):3337.
Yang et al., "Graph r-cnn for scene graph generation," Proceedings of the European Conference on Computer Vision (ECCV), 2018, pp. 670-685.
Zhou et al., "End-to-end multi-view fusion for 3d object detection in lidar point clouds," Proceedings of the Conference on Robot Learning, 2020, 100:923-932.
Zhou et al., "Voxelnet: End-to-end learning for point cloud based 3d object detection," Proceedings of the IEEE Conference on Computer Vision and Pattern Recognition, 2018, pp. 4490-4499.

\* cited by examiner

SPATIO-TEMPORAL-INTERACTIVE NETWORKS

CROSS-REFERENCE TO RELATED APPLICATION

This application claims the benefit of U.S. Provisional Application No. 62/936,259, filed on Nov. 15, 2019. The disclosure of the prior application is considered part of and is incorporated by reference in the disclosure of this application.

BACKGROUND

This specification relates to processing point cloud data using neural networks to generate an output characterizing one or more agents in the environment.

The environment may be a real-world environment, and the agents may be, e.g., pedestrians in the vicinity of an autonomous vehicle in the environment. Making predictions about pedestrians in the environment is a task required for motion planning, e.g., by the autonomous vehicle.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make predictions in a production system.

SUMMARY

This specification generally describes a system implemented as computer programs on one or more computers in one or more locations that process a temporal sequence of point cloud data inputs to make predictions about agents, e.g., pedestrians, vehicles, bicyclists, motorcyclists, or other moving objects, characterized by the point cloud data inputs.

The subject matter described in this specification can be implemented in particular embodiments so as to realize one or more of the following advantages.

Detecting agents and, more specifically, pedestrians and predicting future trajectories for them are critical tasks for numerous applications, such as autonomous driving. In particular, to drive safely and smoothly, autonomous vehicles not only need to detect where the objects are currently (i.e., object detection), but also need to predict where they will go in the future (i.e., trajectory prediction). Among the different types of objects that are frequently encountered by self-driving cars, pedestrian is an important and difficult type for existing techniques to detect and predict accurately. The difficulty comes at least in part from the complicated properties of pedestrian appearance and behavior, e.g., deformable shape of pedestrian bodies and interpersonal relations between pedestrians.

Existing systems either treat the detection and trajectory prediction as separate tasks or simply add a trajectory regression head on top of an object detector.

The described techniques, on the other hand, employ an end-to-end two-stage neural network, referred to as a spatio-temporal-interactive network. In addition to 3D geometry modeling of pedestrians, the spatio-temporal-interactive network models the temporal information for each of the pedestrians. To do so, the spatio-temporal-interactive network predicts both current and past locations in the first stage, so that each pedestrian can be linked across frames and comprehensive spatio-temporal information can be captured in the second stage. Also, the spatio-temporal-interactive network models the interaction among objects with an interaction graph, to gather information among the neighboring objects for any given pedestrian. This results in a system that achieves state-of-the-art results in both object detection and future trajectory prediction for agents, e.g., for the pedestrian agent type.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes how a vehicle, e.g., an autonomous or semi-autonomous vehicle, can generate predictions characterizing surrounding agents in the vicinity of the vehicle in the environment by processing a temporal sequence of point cloud inputs.

Each point cloud input includes point cloud data generated from data captured by one or more sensors of a vehicle at a corresponding time step. The point cloud data includes data defining a plurality of three-dimensional points, i.e., coordinates of the points in some specified coordinate system, and, optionally, features for each of the plurality of three-dimensional points, e.g., intensity, second return, and so on.

The sequence is referred to as a "temporal" sequence because the point cloud inputs are ordered within the sequence according to the time at which the sensors captured the data used to generate the point cloud data.

In this specification, an "agent" can refer, without loss of generality, to a vehicle, bicycle, pedestrian, ship, drone, or any other moving object in an environment.

While this description generally describes point cloud processing techniques being performed by an on-board system of an autonomous vehicle, more generally, the described techniques can be performed by any system of one or more computers in one or more locations that receives or generates temporal sequences of point clouds.

Figure 1:
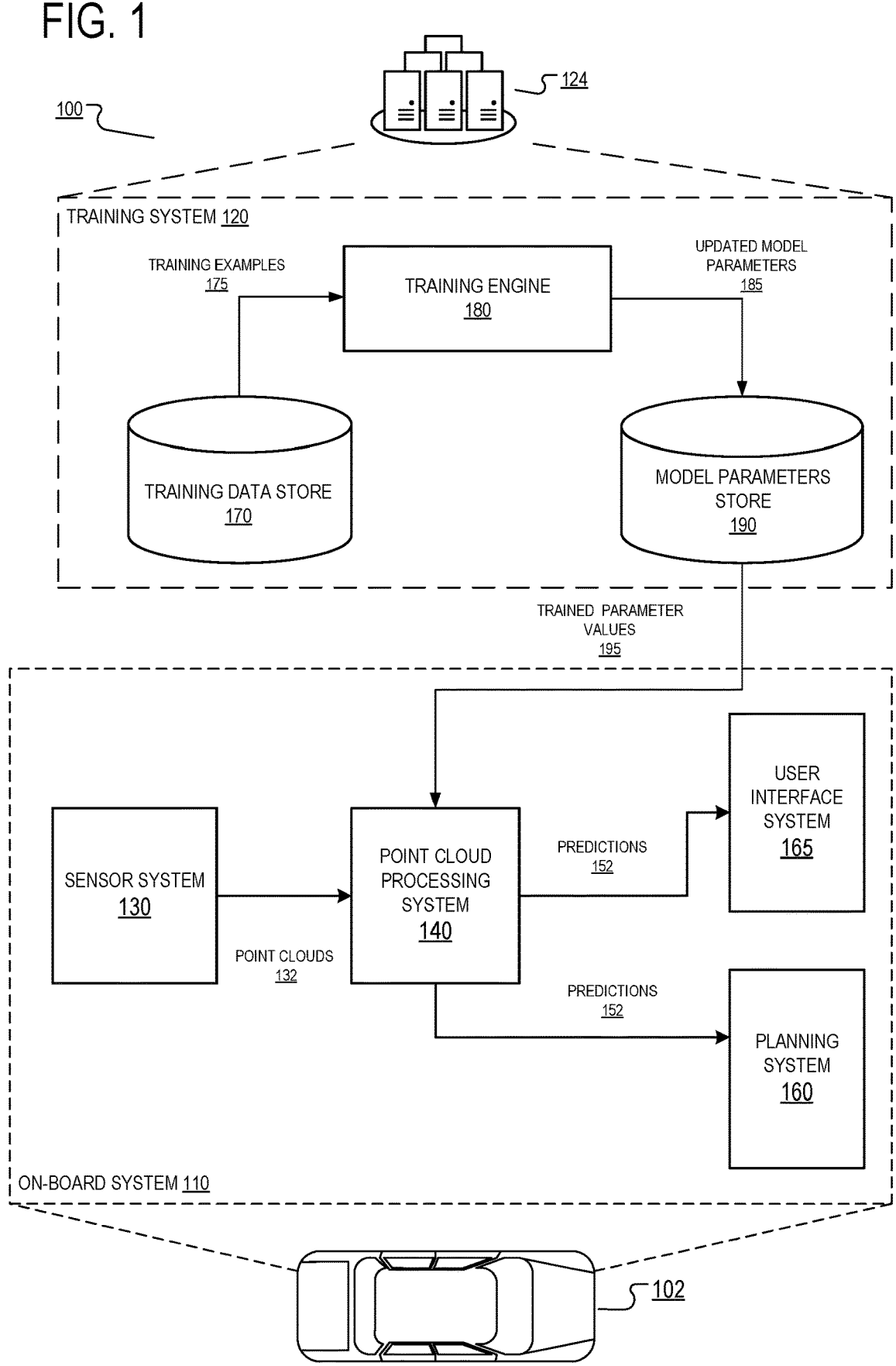
FIG. 1 is a diagram of an example system.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with another vehicle.

The on-board system 110 includes one or more sensor subsystems 130. The sensor subsystems 130 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 130 or other components of the vehicle 102 generate temporal sequences of multiple point cloud inputs using the sensor data generated by one or more of the sensors. Each point cloud input in the temporal sequence includes points that correspond to reflections of laser light transmitted by one of the sensors, i.e., three-dimensional points that correspond to locations where a reflection occurred.

The sensor subsystems 130 send the temporal point cloud sequences 132 to a point cloud processing system 150.

The point cloud processing system 150 processes the temporal sequence 132 to generate a predicted output 152 that characterizes the scene, e.g., an object detection output that identifies locations of one or more agents in the scene, a behavior prediction output that predicts the future trajectory of the agents in the scene, or both.

Generally, the point clouding system 150 processes the temporal sequence 132 using a spatio-temporal-interactive neural network to generate the predicted output 152. Processing the point clouds will be described in more detail below with reference to FIGS. 2-4.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the predicted output 152 generated by the point cloud processing system 150 to one or more other on-board systems of the vehicle 102, e.g., the planning system 160 and/or a user interface system 165.

When the planning system 160 receives the predicted output 152, the planning system 160 can use the predicted output 152 to generate planning decisions that plan a future trajectory of the vehicle, i.e., to generate a new planned vehicle path. For example, the predicted output 152 may contain a prediction that a particular surrounding agent is likely to cut in front of the vehicle 102 at a particular future time point, potentially causing a collision. In this example, the planning system 160 can generate a new planned vehicle path that avoids the potential collision and cause the vehicle 102 to follow the new planned path, e.g., by autonomously controlling the steering of the vehicle, and avoid the potential collision.

When the user interface system 165 receives the predicted outputs 152, the user interface system 165 can use the predicted output 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102). In a particular example, the predicted output 152 may contain a prediction that a particular surrounding agent is likely to step out in front of the vehicle 102, potentially causing a collision. In this example, the user interface system 165 can present an alert message to the driver of the vehicle 102 with instructions to adjust the trajectory of the vehicle 102 to avoid a collision or notifying the driver of the vehicle 102 that a collision with the particular surrounding agent is likely.

To generate the predicted output 152, the point cloud processing system 150 can use trained parameter values 195, i.e., trained model parameter values of the spatio-temporal-interactive neural network that is used by the point cloud processing system 150, obtained from a model parameters store 190 in the training system 120.

The training system 120 is typically hosted within a data center 124, which can be a distributed computing system having hundreds or thousands of computers in one or more locations.

The training system 120 includes a training data store 170 that stores all the training data used to train the trajectory prediction system i.e., to determine the trained parameter values 195 of the point cloud processing system 150. The training data store 170 receives raw training examples from agents operating in the real world. For example, the training data store 170 can receive a raw training example 155 from the vehicle 102 and one or more other agents that are in communication with the training system 120. The raw training example 155 can be processed by the training system 120 to generate a new training example. The new training example can include a temporal sequence of point cloud data that can be used as input for the point cloud processing system 150. The new training example can also include outcome data, e.g., data characterizing the state of the environment surrounding the agent from which the training example 155 was received at one or more future time points, data identifying the objects that are measured in the temporal sequence, or both. This outcome data can be used to generate ground truth outputs, e.g., ground truth trajectories, ground truth detection outputs, or both, for one or more agents in the vicinity of the vehicle or other agent. Each ground truth trajectory identifies the actual trajectory (as derived from the outcome data) traversed by the corresponding agent at the future time points. For example, the ground truth trajectory can identify spatial locations in an agent-centric coordinate system to which the agent moved at each of multiple future time points. Each ground truth detection output identifies the regions in the point clouds in the temporal sequence that correspond to actual measurements of the agent.

The training data store 170 provides training examples 175 to a training engine 180, also hosted in the training system 120. The training engine 180 uses the training examples 175 to update model parameters that will be used by the point cloud processing system 150, and provides the updated model parameters 185 to model parameters store 190. Once the parameter values of the point cloud processing system 150 have been fully trained, the training system 120 can send the trained parameter values 195 to the point cloud processing system 150, e.g., through a wired or wireless connection.

Figure 2:
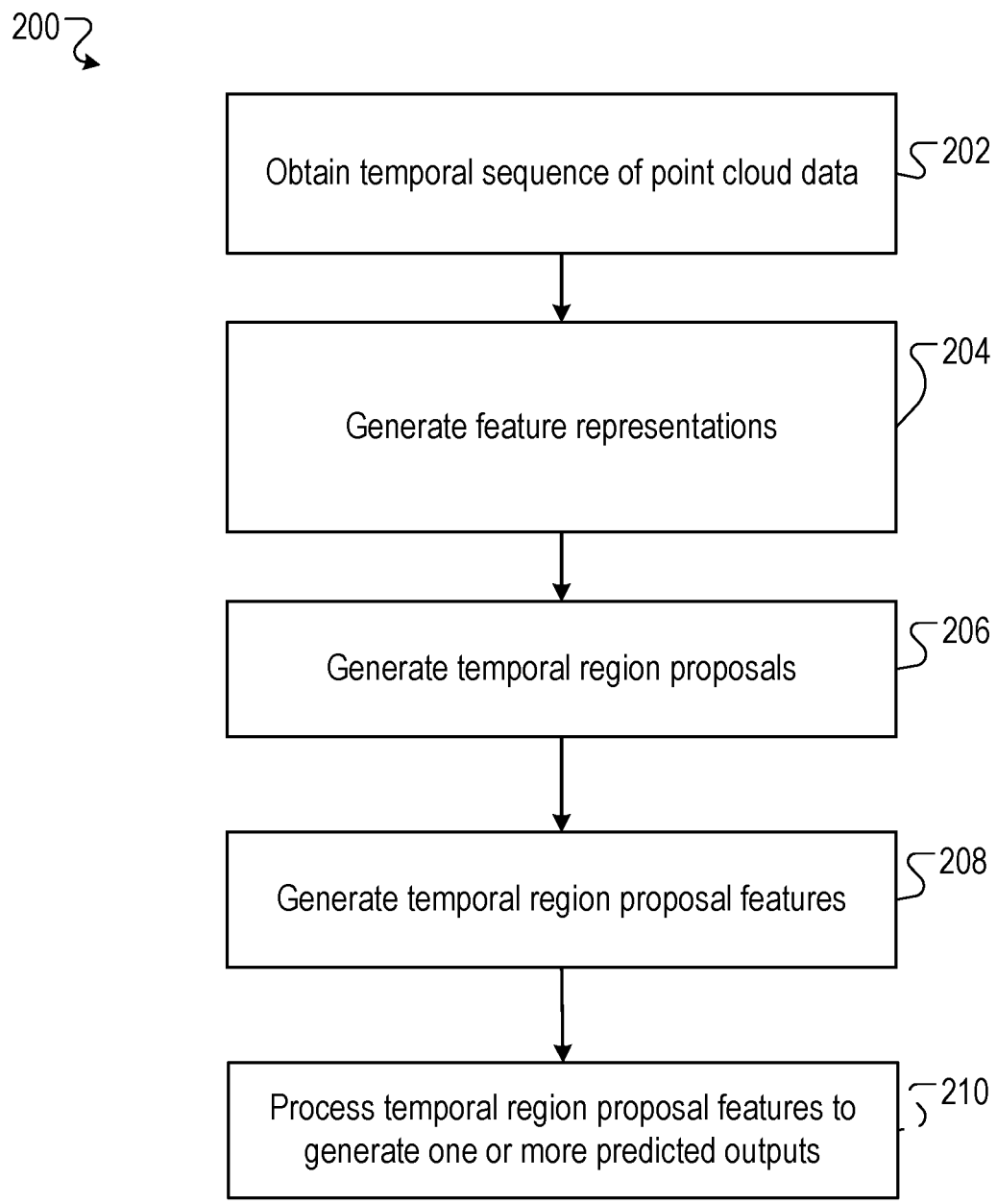
FIG. 2 is a flow diagram of an example process for processing a temporal sequence of point cloud data.

FIG. 2 is a flow diagram of an example process 200 for processing a temporal sequence of point cloud data inputs. For convenience, the process 200 will be described as being performed by a system of one or more computers located in one or more locations. For example, a trajectory prediction system, e.g., the point cloud processing system 150 of FIG. 1, appropriately programmed in accordance with this specification, can perform the process 200.

When performed by a system on-board an autonomous vehicle, the system can repeatedly perform the process 200 as the autonomous vehicle navigates through the environment in order to improve the navigation of the autonomous vehicle.

The system obtains, i.e., receives or generates, a temporal sequence that has respective point cloud inputs at each of a plurality of time steps during a time interval (step 202). Each point cloud input includes point cloud data generated from data captured by one or more sensors of a vehicle at the time step.

The system generates, from the temporal sequence, a respective feature representation for each of a plurality of time windows within the time interval (step 204). In some cases each time window corresponds to a respective one of the time steps. In other cases, each time window corresponds to multiple time steps, i.e., is generated from the point cloud data at multiple ones of the time steps. Each feature representation includes respective features for each of a plurality of spatial locations in the feature representation and each spatial location in each feature representation maps to a corresponding location in the environment. For example, each "pixel" (spatial location) in the feature representation can be mapped to a corresponding region of the environment according to some coordinate system, e.g., a perspective view or a top-down view. Generating the feature representations will be described in more detail below with reference to FIG. 3.

The system processes the feature representations using a temporal region proposal neural network to generate a plurality of temporal region proposals (step 206).

Each temporal region proposal corresponds to a possible agent in the environment and each temporal region proposal identifies a respective spatial region in each of the feature representations, i.e., a region that includes multiple contiguous spatial locations in the feature representation. That is, each temporal region proposal identifies respective spatial regions in multiple ones of the feature representations.

For each temporal region proposal, the respective spatial region identified by the temporal region proposal in any given feature representation is a prediction of where in the environment the corresponding possible agent was located during the time window corresponding to the given feature representation.

The agents are referred to as "possible" agents because not all of the proposals may correspond to actual agents in the environment, i.e., the temporal region proposal neural network may generate more proposals than there actual agents in the environment.

Generating the temporal region proposals will be described in more detail below with reference to FIG. 3.

The system generates, for each temporal region proposal and from the feature representations, temporal region proposal features (step 208). The temporal region proposal features for any given proposal characterize the spatial regions identified in the proposal. Generating these features is described in more detail below with reference to FIG. 4.

For each temporal region proposal, the system can then process the temporal region proposal features to generate one or more predictions for the corresponding possible agent (step 210).

For example, the system can process the temporal region proposals to generate a first output that predicts a future trajectory after the time interval of the possible agent corresponding to the temporal region proposal.

As another example, the system can process the temporal region proposal features to generate a second output that identifies a current location in the environment of the corresponding possible agent at the end of the time interval.

As another example, the second output can also include a final confidence score that represents a likelihood that the corresponding possible agent is an actual agent in the environment.

Figure 3:
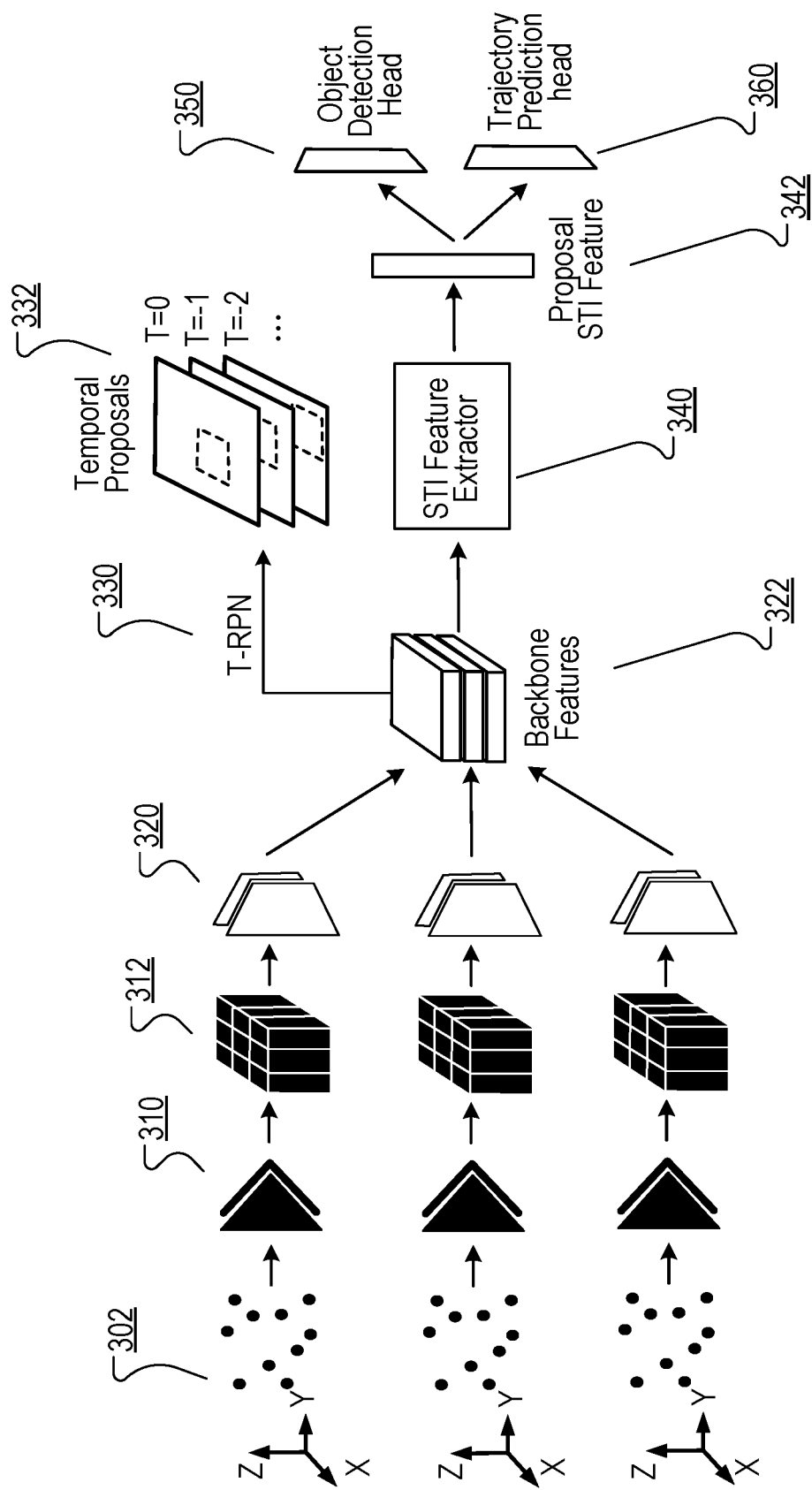
FIG. 3 illustrates the operation of the point cloud processing system for a given temporal sequence of point cloud inputs.

FIG. 3 illustrates the operation of the point cloud processing system for a given temporal sequence of point cloud inputs.

As shown in FIG. 3, the system receives an input temporal sequence 302 that includes three point clouds at each of three time steps during a time interval.

The system then processes the sequence 302 using a spatio-temporal-interactive neural network that includes, in the example of FIG. 3, an encoder neural network 310, a backbone neural network 320, a temporal region proposal neural network 330, a spatio-temporal-interactive (STI) feature extractor 340, an object detection head 350, and a trajectory prediction head 360.

The system processes the temporal sequence 302 using an encoder neural network 310 to generate a respective initial feature representation 312 for each of a plurality of time windows within the time interval. While the example of FIG. 3 shows that there are the same number of initial feature representations 312 as there are point clouds in the input sequence, in practice, to reduce the memory usage of the processing pipeline, the system can generate a reduced number of feature representations so that each time window corresponds to multiple time steps.

In particular, to generate the initial feature representation 312 for a given time interval, the system can process each of the point clouds at time steps in the given time interval using the encoder neural network to generate a respective pseudo image, i.e., an H×W×C tensor, for each point cloud and then concatenates the resulting pseudo images, i.e., along the depth dimension, to generate the feature representation for the time interval.

The encoder neural network 310 can be any appropriate encoder neural network that maps an input point cloud to a pseudo image. For example, the encoder neural network can assign the points in the point cloud to voxels and then generate a respective feature vector for each voxel. One example of such an encoder neural network is described in Yin Zhou and Oncel Tuzel. Voxelnet: End-to-end learning for point cloud based 3d object detection. In Proceedings of the IEEE Conference on Computer Vision and Pattern Recognition, pages 4490-4499, 2018. Another example of such an encoder neural network is described in Alex H Lang, Sourabh Vora, Holger Caesar, Lubing Zhou, Jiong Yang, and Oscar Beijbom. Pointpillars: Fast encoders for object detection from point clouds. In Proceedings of the IEEE Conference on Computer Vision and Pattern Recognition, pages 12697-12705, 2019.

The system processes the initial feature representations 312 using a backbone neural network 320 to generate the feature representations 322 (also referred to as backbone features).

In particular, the system processes each initial feature representation 312 using the backbone neural network 320 to generate a respective feature representation 322 for the corresponding time window. Each feature representation has the same spatial dimensionality as the corresponding initial feature representation but may include a different number of channels than the initial feature representation.

The backbone neural network 320 can be any appropriate convolutional neural network that is configured to receive an input pseudo image and to process the input pseudo image to generate an output representation that has the same spatial dimensionality as the input pseudo image. As a particular example, the backbone neural network 320 can have a U-net architecture, which is described in more detail in Olaf Ronneberger, Philipp Fischer, and Thomas Brox. Unet: Convolutional networks for biomedical image segmentation. In International Conference on Medical image computing and computer-assisted intervention, pages 234-241. Springer, 2015.

The system then processes the feature representations 322 using to generate a plurality of temporal region proposals 332.

Each temporal region proposal 332 corresponds to a possible agent in the environment and each temporal region proposal 332 identifies a respective spatial region in each of the feature representations, i.e., a region that includes multiple contiguous spatial locations in the feature representation.

For each temporal region proposal 332, the respective spatial region identified by the temporal region proposal in any given feature representation 322 is a prediction of where in the environment the corresponding possible agent was located during the time window corresponding to the given feature representation. In other words, for a particular feature representation, the spatial region is a prediction of where the possible agent was located during the corresponding time window.

In particular, the temporal region proposal neural network 330 can generate a fixed number of candidate temporal region proposals, each corresponding to a different candidate possible agent in the environment. The agents are referred to as "possible" agents because not all of the proposals may correspond to actual agents in the environment.

More specifically, the temporal region proposal neural network 330 can generate a respective candidate temporal region proposal corresponding to each of a fixed number of fixed anchor regions. Each anchor region is a different contiguous spatial region, e.g., a box, within the spatial dimensions of the feature representations. Thus, the output of the neural network 330 includes, for each candidate temporal region proposal and for each feature representation, a regression vector that identifies a region in each feature representation relative to the anchor region corresponding to the temporal region proposal. That is, for candidate temporal region proposal, the output includes a respective regression vector for each of the plurality of feature representations.

In particular, each anchor region can be defined by fixed coordinates of a box in the feature representation and a fixed heading of the box. Each regression vector defines a respective delta value for each of the coordinates and for the heading. The delta values can be applied to the fixed coordinates and headings of the box to generate the spatial region specified by the temporal proposal. By having different delta values and different headings for different feature representations, the neural network 330 can model the trajectory of the possible agent across time.

As a specific example, each anchor can be specified by a set of values that include the x, y coordinates of the box center, the width w of the box, the length 1 of the box, and the heading h of the box. The regression vector for the feature representation corresponding to the most recent time window can include delta values for the x and y coordinates, the width of the box, the length of the box, and the heading of the box. For the other feature representations, the regression vectors can include only delta values for the x and y coordinates, and the heading of the box, since the size of the agent should not change across different time windows within the time intervals.

The delta values can then be mapped to a respective spatial region within each feature representation by transforming the anchor box using the delta values in the corresponding regression vector. An example of the transformations that are applied to the most recent feature representation (at time t=0) is shown below, where the superscript "a" refers to a value for an anchor box, the superscript "gt" refers to a value for the corresponding ground truth box, and the prefix "d" refers to a delta value for the value that follows:

$$dx_0^a = (x_0^{gt} - x^a) / \sqrt{(x^a)^2 + (y^a)^2} \quad (1)$$

$$dy_0^a = (y_0^{gt} - y^a) / \sqrt{(x^a)^2 + (y^a)^2} \quad (2)$$

$$dw^a = \log \frac{w^{gt}}{w^a} \quad (3)$$

$$dl^a = \log \frac{l^{gt}}{l^a} \quad (4)$$

$$dh_0^a = \sin \frac{h_0^{gt} - h^a}{2} \quad (5)$$

By applying equations (1) through (5) above, the system can determine ground truth delta values that are used as targets for the training of the neural network 330.

In other words, the system can compute a loss between predicted delta values and the delta values that are found by applying equations (1) through (5), e.g., an L1 loss, a smooth L1 loss, or other loss that measures a distance between two vectors, in order to update the parameters of the neural network 330 and the neural networks 310 and 320, e.g., through stochastic gradient descent with After training, by reversing equations (1) through (5) to solve for the values with the "gt" superscripts given the delta values and the anchor box values, the system can obtain the values that define a region proposal for the most recent time window, i.e., the region proposal will be defined by the "gt" superscripted values in equation (1) through (5) given the predicted "d" prefixed values and the fixed "a" superscripted values.

Similar equations can be used to compute losses and generate proposals for earlier time windows in the time window, except with the width and length being fixed to the width and length predicted for the most recent time window.

Thus, the system can train the neural networks 330, 320, and 310 to minimize a combination, e.g., a sum or a weighted sum, of losses for the time intervals in the time window.

To generate the regression vectors for the feature representations, the neural network 330 concatenates the feature representations in the channel dimension and applies a 1×1 convolution to the concatenated feature representations to generate a temporal-aware feature map. The neural network 330 then generates the regression vectors for each of the candidate temporal proposals by applying 1×1 convolutional layers over the temporal-aware feature map.

In some implementations, the candidate temporal region proposals are the final set of temporal region proposals 332.

In some other implementations, however, the neural network 330 filters the candidate temporal region proposals to generate the temporal region proposals 332.

In particular, the neural network 330 can generate the plurality of candidate temporal region proposals and a confidence score for each of the candidate temporal region proposals. The confidence score indicates a predicted likelihood that the candidate temporal region proposal corresponds to an actual agent in the environment. The neural network 330 can also generate these confidence scores by applying 1×1 convolutions over the temporal-aware feature map.

The neural network 330 can then filter the candidate temporal region proposals by applying non-maximum suppression to the regions of the feature representation corresponding to the most recent time window identified by the candidate temporal region proposals based on the confidence scores to remove redundant candidate temporal region proposals.

In these implementations, the system can include a classification loss in the loss function used to train the neural networks 330, 320, and 310, e.g., a cross-entropy loss, that, if the anchor has a corresponding ground truth object, measures an error between the confidence score and a target confidence score that is equal to 1 if the region in the most recent feature representation in the proposal has more than a threshold amount of overlap as measured by intersection over union with the ground truth region and 0 otherwise.

The system then generates, for each of the temporal region proposals 332, respective temporal region proposal features 342 using a spatio-temporal-interactive (STI) feature extractor 340.

Figure 4:
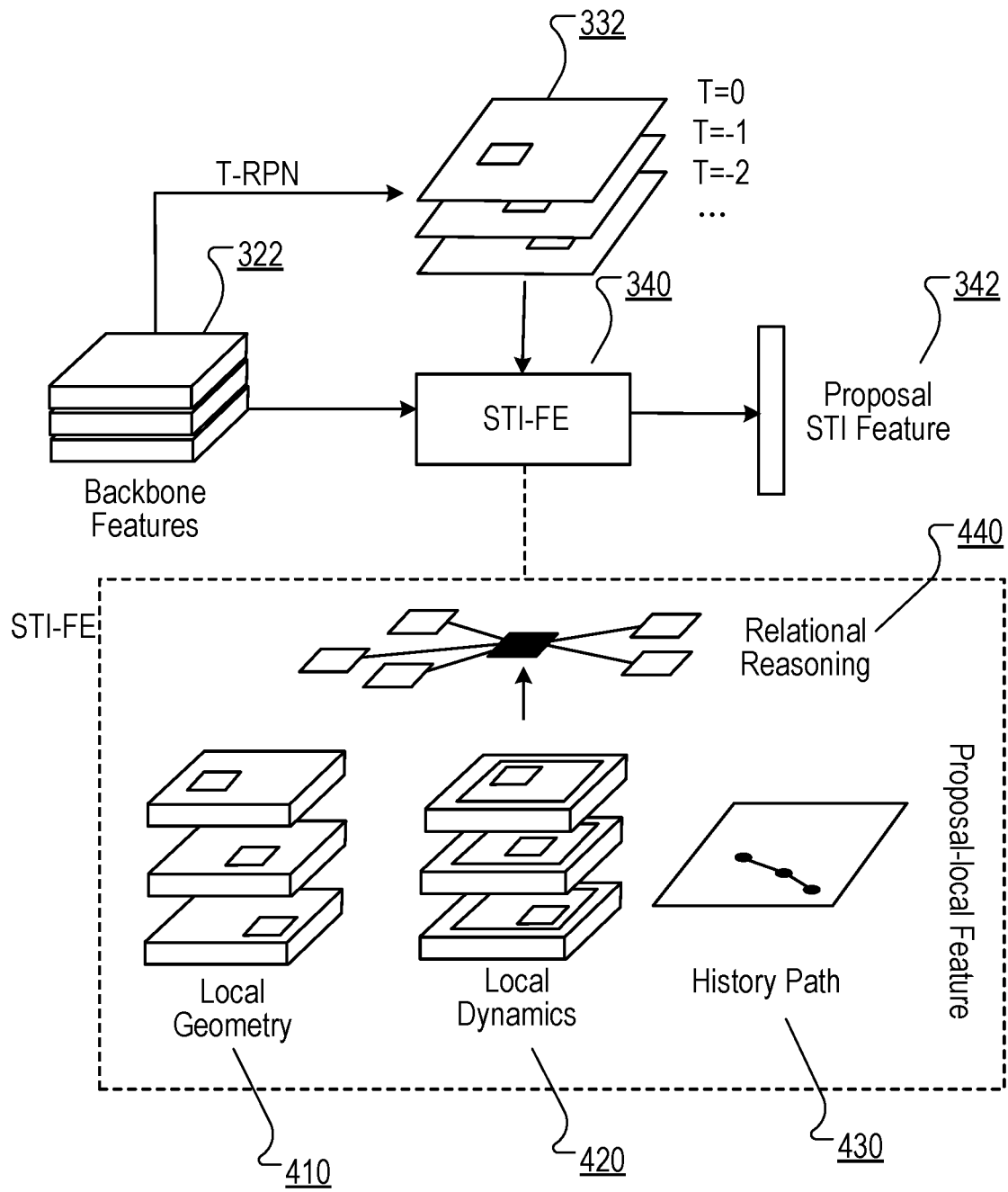
FIG. 4 shows an example of the generation of the temporal region proposal features of a given temporal region proposal by the STI feature extractor.

FIG. 4 shows an example of the generation of the temporal region proposal features 342 of a given temporal region proposal 332 by the STI feature extractor 340.

As shown in FIG. 4, the STI feature extractor generates local geometry features 410, local dynamics features 420, and history path features 430.

To generate the local geometry features 410 for the temporal region proposal 322, the extractor 340 crops each feature representation to include only the region within that feature representation that is identified by the temporal region proposal 322. That is, as described above, the temporal region proposal 322 identifies a respective region within each feature representation. The extractor 340 generates local geometry features that include only the identified regions with each of the feature representations. In some cases, to simplify computation, the system approximates the identified regions by mapping each identified region to the closest standing box within the feature representation to the identified region.

To generate the local dynamics features 420 for the temporal region proposal 322, the extractor 340 identifies a spatial region that includes all of the regions identified by the temporal region proposal 322 in all of the feature representations and cropping each feature representation to include only the identified region. That is, the extractor 340 generates a "meta box" that covers the whole movement of the possible agent within the time interval by identifying a region that is a super set of, i.e., includes all of, the regions identified by the temporal region proposal 322 in any of the feature representations. In particular, the identified region can be the smallest spatial region that includes all of the regions identified by the temporal region proposal in all of the feature representations. In some cases, to simplify computation, the system approximates the smallest spatial region by mapping each identified region to the closest standing box within the feature representation to the identified region and then computing the smallest box that includes all of the closest standing boxes for all of the identified regions. Because the local dynamics feature 420 covers all of the movement of the possible agent, the dynamics feature captures the direction, curvature and speed of the agent, all of which are useful for future trajectory prediction.

To history path feature 430 for the temporal region proposal 322 identifies a location displacement of the region regions identified by the temporal region proposal 322 across the feature representations. In particular, the extractor 340 generates the history path feature 430 based on, for each pair of feature representations that includes the feature representation corresponding to the most recent time window, the difference in the location of (i) the center of the spatial region in the feature representation for the most recent time window and (ii) the center of the spatial region in the other feature representation in the pair. For example, the system can compute, for each pair, the difference between the x and y coordinates of the centers of the two spatial regions in the pair and then processes these differences using a multi-layer perceptron (MLP) to generate the history path feature 430.

The extractor 340 then generates the temporal region proposal features 342 for the proposal 332 from the features 410, 420, and 430.

As a particular example, the extractor 340 can generate the temporal region proposal features 342 by processing the local geometry features 410 and the local dynamics features 420 using a neural network, e.g., a convolutional neural network, e.g., a ResNet, that has a pooling layer, e.g., a global average pooling layer, as the output layer of the neural network, to generate a combined feature and concatenating the combined feature with the history path feature 342. Processing the local geometry features 410 and the local dynamics features 420 using the neural network can aggregate spatial and temporal knowledge across the feature representation for the proposal 332.

For many types of agents, e.g., pedestrians, the future trajectory of any given agent could be influenced by the surrounding agents' behaviors. In order to model such interactions among agents, the extractor 340 generates, for each temporal region proposal and from the temporal region proposal features 342 for the proposals 332, an interaction embedding 440 that represents interactions of the corresponding possible agent with the possible agents corresponding to the other temporal region proposals.

To generate the interaction embedding 440, the extractor 340 represents each temporal proposal as a graph node, with the embedding of each node being the proposal features 342 for the corresponding temporal proposal.

The extractor 340 computes an interaction score for each pair of two nodes in the graph from the proposal features 342 for the temporal proposals represented by the two nodes. In particular, the extractor 340 can apply a first learned function to both of the proposal features 342 to generate respective transformed proposal features for both of the nodes and then generate the interaction score by applying a second learned function to the transformed proposal features. For example, both of the learned functions can be fully-connected layers.

The extractor 340 then determines the interaction embedding $g_i$ 440 for each particular node i as follows:

$$g_i = \Sigma_j \frac{expexp\ \{v_{ij}\}}{\Sigma_j expexp\ \{v_{ij}\}} \gamma([f_i, f_j]),$$

where j ranges over all of the temporal region proposals, $v_{ij}$ is the interaction score between node i and node j, $f_i$ is the embedding of node i, and $\gamma$ is a learned mapping function, e.g., a fully-connected layer.

Returning to the example of FIG. 3, the system generates two predicted outputs for each temporal region proposal 332. In particular, the system processes the temporal region proposal features 342 for any given region using an object detection head 350 to generate an object detection output and processes the temporal region proposal features 342 for the given region using a trajectory prediction head 360 to generate a trajectory prediction output.

The object detection head 350 includes a first set of one or more fully connected layers that process the temporal region proposal features 342 to regress a current location in the environment of the corresponding possible agent at the end of the time interval. For example, the output of the object detection head 350 can be the regressed coordinates of a region, e.g., a bounding box, in the feature representations that represents the predicted, location of the possible agent at the end of the time interval.

The object detection head 350 can also include a second set of one or more fully connected layers that generate a classification for the possible agent that includes a confidence score that represents a likelihood that the corresponding possible agent is an actual agent in the environment.

Optionally, the system can use these confidence scores to perform non-max suppression on the regressed locations generated by the object detection 350 before outputting the object detection outputs, e.g., to a planning system of the autonomous vehicle.

The trajectory prediction head 360 predicts the future trajectory of the possible agent. More specifically, because, as indicated above, the future trajectory of an agent could be influenced by the surrounding agents' behavior, the trajectory prediction head 360 processes the interaction embedding for the temporal feature proposal and the temporal region proposal features for the proposal using one or more neural network layers, e.g., fully-connected layers, to regress the future trajectory output. The future trajectory output can include the x,y coordinates and, optionally, the heading of the possible agent at each of multiple future time points.

During training, the system can use the object detection output, the classification output, and the trajectory prediction output to adjust the values of the parameters of the heads 350 and 360, the detector 340, and, optionally, the neural networks 330, 320, and 310 through backpropagation. In particular the system can train these components to minimize a loss that is a combination of, e.g., a weighted sum or a sum, of an object detection loss, e.g., an L1 loss, a smooth L2 loss or other regression loss, a classification loss, e.g., a cross-entropy loss, and a trajectory prediction loss, e.g., an L1 loss, a smooth L1 loss or other regression loss using the respective ground truth outputs for each of the proposals that have a corresponding ground truth agent.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
    obtaining a temporal sequence comprising respective point cloud inputs at each of a plurality of time steps during a time interval, each point cloud input comprising point cloud data generated from data captured by one or more sensors of a vehicle at the time step;
    generating, from the temporal sequence, a respective feature representation for each of a plurality of time windows within the time interval, wherein each feature representation includes respective features for each of a plurality of spatial locations in the feature representation and each spatial location in each feature representation maps to a corresponding location in the environment;
    processing the feature representations using a temporal region proposal neural network to generate a plurality of temporal region proposals, wherein:
        each temporal region proposal corresponds to a possible agent in the environment,
        each temporal region proposal identifies a respective spatial region in each of the feature representations that comprises a plurality of spatial locations in the feature representation, and
        for each temporal region proposal, the respective spatial region identified by the temporal region proposal in any given feature representation is a prediction of where in the environment the corresponding possible agent was located during the time window corresponding to the given feature representation;
    generating, for each temporal region proposal and from the feature representations, temporal region proposal features;
    computing an interaction score for each pair of temporal region proposals in the plurality of temporal region proposals;
    determining, for each temporal region proposal and from one or more of the computed interaction scores, an interaction embedding that represents interactions of the corresponding possible agent with the possible agents corresponding to the other temporal region proposals; and
    for each temporal region proposal, processing the interaction embedding for the temporal feature proposal and the temporal region proposal features to generate a first output that predicts a future trajectory after the time interval of the possible agent corresponding to the temporal region proposal.

2. The method of claim 1, wherein the possible agents are pedestrians.

3. The method of claim 1, further comprising:
    for each temporal region proposal, processing the temporal region proposal features to generate a second output that identifies a current location in the environment of the corresponding possible agent at the end of the time interval.

4. The method of claim 3, wherein the second output also includes a final confidence score that represents a likelihood that the corresponding possible agent is an actual agent in the environment.

5. The method of claim 1, wherein generating, for each temporal region proposal and from the feature representations, temporal region proposal features comprises:
    generating local geometry features for the temporal region proposal by cropping each feature representation to include only the region identified by the temporal region proposal.

6. The method of claim 1, wherein generating, for each temporal region proposal and from the feature representations, temporal region proposal features comprises:
    generating local dynamics features for the temporal region proposal by:
        identifying a region that includes all of the regions identified by the temporal region proposal in all of the feature representations; and
        cropping each feature representation to include only the identified region.

7. The method of claim 6, wherein the identified region is a smallest spatial region that includes all of the regions identified by the temporal region proposal in all of the feature representations.

8. The method of claim 1, wherein generating, for each temporal region proposal and from the feature representations, temporal region proposal features comprises:
    generating a history path feature for the temporal region proposal that identifies a location displacement of the region regions identified by the temporal region proposal across the feature representations.

9. The method of claim 8, when also dependent on claims 6 and 7, wherein generating temporal region proposal features comprises:
processing the local geometry features and the local dynamics features using a neural network to generate a combined feature; and
concatenating the combined feature with the history path feature.

10. The method of claim 1, wherein each temporal region proposal corresponds to an anchor region, and wherein the temporal region proposal neural network generates an output that includes, for each temporal region proposal and for each feature representation, a regression vector that identifies a region in each feature representation relative to the anchor region corresponding to the temporal region proposal.

11. The method of claim 10, wherein the anchor region is defined by coordinates of a box in a feature representation and a heading of the box, and wherein each regression vector includes a respective delta value for each of the coordinates and for the heading.

12. The method of claim 1, wherein the temporal region proposal neural network generates a plurality of candidate temporal region proposals and a confidence score for each of the candidate temporal region proposals that indicates a predicted likelihood that the candidate temporal region proposal corresponds to an actual agent in the environment, and wherein generating the plurality of temporal region proposals comprises:
applying non-maximum suppression to the regions of the feature representation corresponding to the most recent time window identified by the candidate temporal region proposals based on the confidence scores to remove redundant candidate temporal region proposals.

13. A method performed by one or more computers, the method comprising:
obtaining a temporal sequence of point cloud data for a time interval;
generating, from the temporal sequence, respective feature representations for each of a plurality of time windows within the time interval;
processing, using a temporal region proposal neural network, the feature representations to generate a plurality of temporal region proposals, each temporal region proposal corresponding to a different possible agent;
generating, for each temporal region proposal and from the feature representations, temporal region proposal features;
computing an interaction score for each pair of temporal region proposals in the plurality of temporal region proposals;
determining, for each temporal region proposal and from one or more of the computed interaction scores, an interaction embedding that represents interactions of the corresponding possible agent with the possible agents corresponding to the other temporal region proposals; and
for each temporal region proposal, processing the interaction embedding for the temporal feature proposal and the temporal region proposal features to generate a first output that predicts a future trajectory after the time interval of the possible agent corresponding to the temporal region proposal.

14. The method of claim 13, further comprising:
for each temporal region proposal, processing the temporal region proposal features to generate a second output that identifies a current location in the environment of the corresponding possible agent at the end of the time interval.

15. The method of claim 14, wherein the second output also includes a final confidence score that represents a likelihood that the corresponding possible agent is an actual agent in the environment.

16. The method of claim 13, wherein each temporal region proposal corresponds to an anchor region, and wherein the temporal region proposal neural network generates an output that includes, for each temporal region proposal and for each feature representation, a regression vector that identifies a region in each feature representation relative to the anchor region corresponding to the temporal region proposal.

17. The method of claim 16, wherein generating, for each temporal region proposal and from the feature representations, temporal region proposal features comprises:
generating local geometry features for the temporal region proposal by cropping each feature representation to include only the region identified by the temporal region proposal.

18. A system comprising one or more computers and one or more storage devices storing instructions that, when executed by the one or more computers, cause the one or more computers to perform operations comprising:
obtaining a temporal sequence of point cloud data for a time interval;
generating, from the temporal sequence, respective feature representations for each of a plurality of time windows within the time interval;
processing, using a temporal region proposal neural network, the feature representations to generate a plurality of temporal region proposals, each temporal region proposal corresponding to a different possible agent;
generating, for each temporal region proposal and from the feature representations, temporal region proposal features;
computing an interaction score for each pair of temporal region proposals in the plurality of temporal region proposals;
determining, for each temporal region proposal and from one or more of the computed interaction scores, an interaction embedding that represents interactions of the corresponding possible agent with the possible agents corresponding to the other temporal region proposals; and
for each temporal region proposal, processing the interaction embedding for the temporal feature proposal and the temporal region proposal features to generate a first output that predicts a future trajectory after the time interval of the possible agent corresponding to the temporal region proposal.

* * * * *